(12) United States Patent
Philbin

(10) Patent No.: US 11,892,025 B2
(45) Date of Patent: Feb. 6, 2024

(54) MAGNETIC LOCKNUT SOCKET

(71) Applicant: Sean Philbin, Astorville (CA)

(72) Inventor: Sean Philbin, Astorville (CA)

( * ) Notice: Subject to any disclaimer, the term of this patent is extended or adjusted under 35 U.S.C. 154(b) by 655 days.

(21) Appl. No.: 17/094,813

(22) Filed: Nov. 11, 2020

(65) Prior Publication Data

US 2021/0285483 A1 Sep. 16, 2021

Related U.S. Application Data

(60) Provisional application No. 62/988,396, filed on Mar. 12, 2020.

(51) Int. Cl.
*F16B 39/12* (2006.01)
*B25B 13/06* (2006.01)
*B25B 13/48* (2006.01)

(52) U.S. Cl.
CPC .............. *F16B 39/12* (2013.01); *B25B 13/06* (2013.01); *B25B 13/48* (2013.01)

(58) Field of Classification Search
CPC .......... F16B 39/08; F16B 39/10; F16B 39/12; B25B 13/06; B25B 13/48; Y10S 411/926; Y10S 411/931
USPC .......................................... 411/204, 222, 223
See application file for complete search history.

(56) References Cited

U.S. PATENT DOCUMENTS

| | | | | |
|---|---|---|---|---|
| 4,090,545 A | * | 5/1978 | Ritter, Jr. | F16B 39/04 411/209 |
| 5,259,278 A | * | 11/1993 | Leas | B25B 23/12 81/125 |
| 5,618,143 A | * | 4/1997 | Cronin, II | F16D 41/061 411/948 |
| 6,164,166 A | * | 12/2000 | Whiteford | B25B 13/12 81/60 |
| 7,927,052 B1 | * | 4/2011 | Varden | F16B 39/108 411/197 |
| 2010/0197148 A1 | * | 8/2010 | Rudisill | H01R 13/6205 439/40 |
| 2015/0292544 A1 | * | 10/2015 | Rousseau | F01D 5/066 411/204 |
| 2015/0328755 A1 | * | 11/2015 | Marshall | B25B 27/02 81/125 |
| 2016/0369831 A1 | * | 12/2016 | Benz | F16B 37/00 |
| 2018/0111237 A1 | * | 4/2018 | Michael | B25B 27/14 |
| 2018/0258976 A1 | * | 9/2018 | Li | F16B 39/12 |
| 2019/0076995 A1 | * | 3/2019 | Albertson | B25B 23/0035 |

* cited by examiner

*Primary Examiner* — Roberta S Delisle
(74) *Attorney, Agent, or Firm* — Robert S. Smith

(57) ABSTRACT

A socket includes a housing having a first end dimensioned and configured for cooperation with an associated wrench and a second end dimensioned and configured for engagement with a locknut. The second end includes a first plurality of magnets disposed to maintain a single locknut against the second end, the second end and a second plurality of magnets disposed to maintain the second end against an associated housing with the associated locknut disposed intermediate the second end of the socket and the associated housing. The second end of the socket including a plurality of depending feet dimensioned and configured for meshing engagement with the locknut whereby rotation of the socket causes rotation of the locknut when the locknut is engaged with an associated externally threaded connector to move the locknut axially along the external threads of the externally threaded connector.

9 Claims, 4 Drawing Sheets

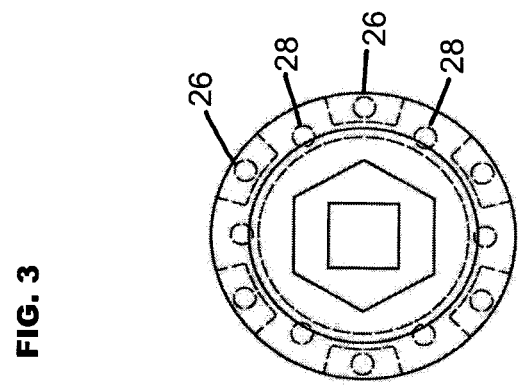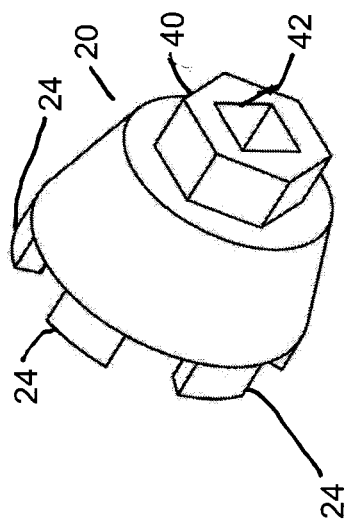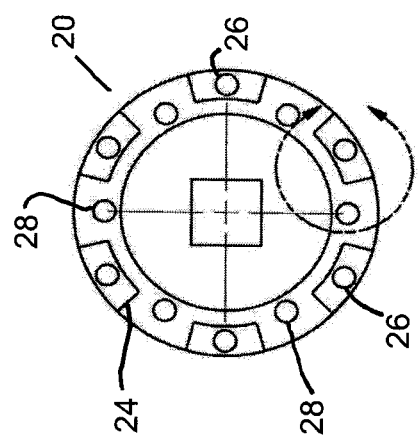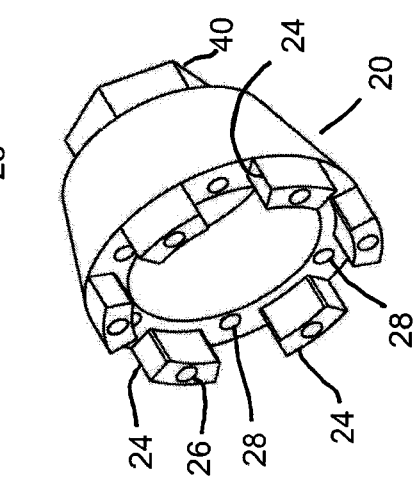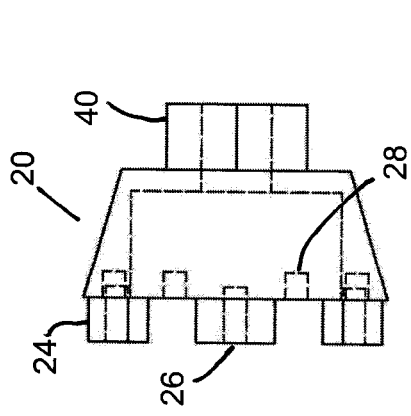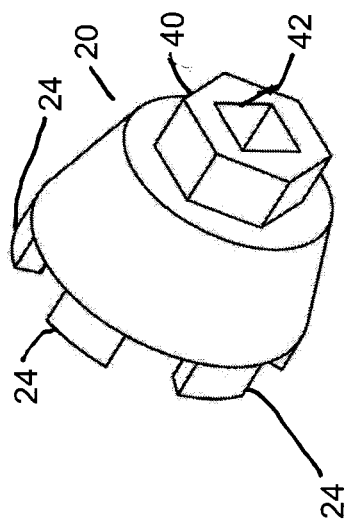

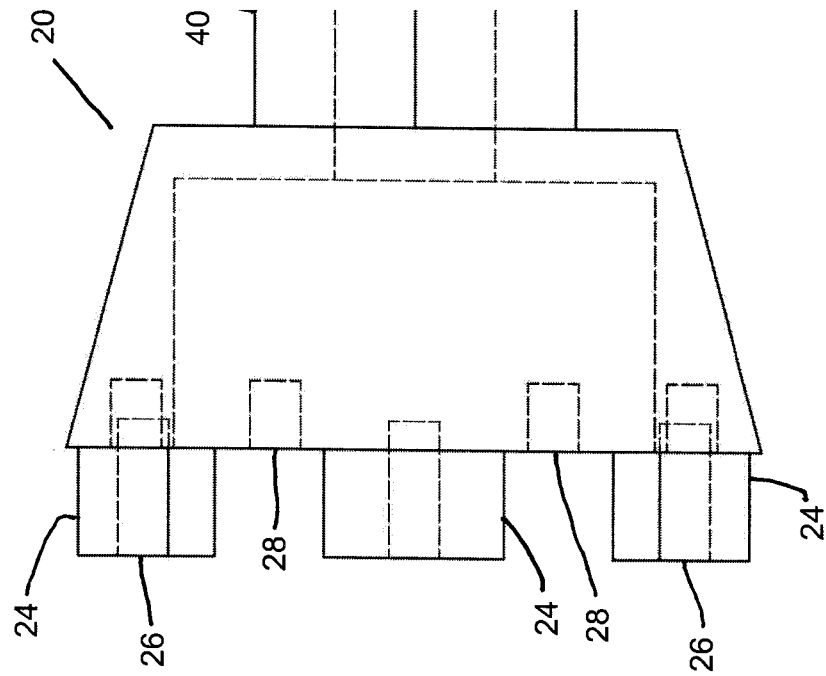
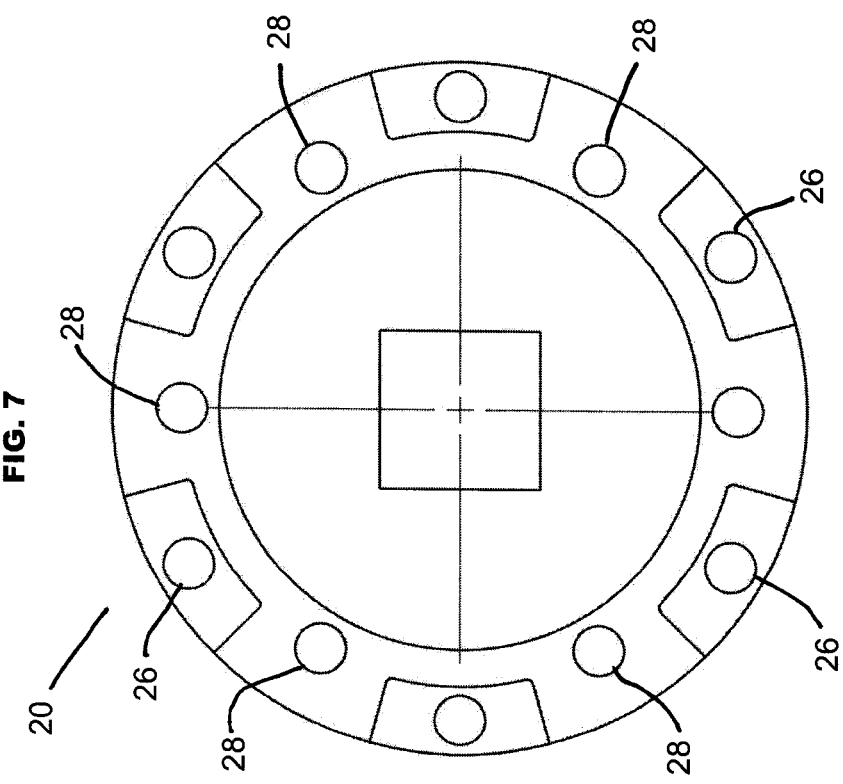

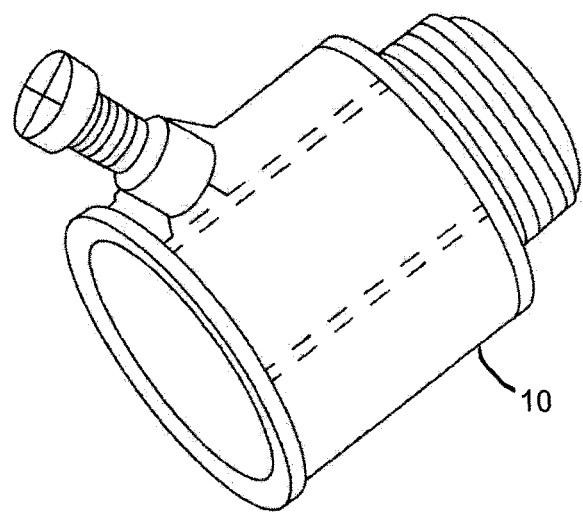
FIG. 10
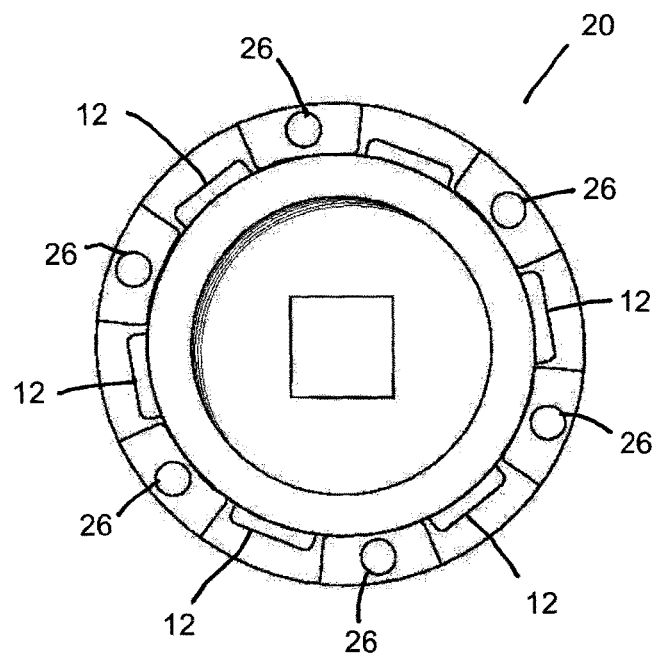
FIG. 9
FIG. 11

MAGNETIC LOCKNUT SOCKET

TECHNICAL FIELD

The present invention is generally directed to the construction industry. More particularly, the present invention is directed to the wiring for electrical power and data communications applications. Even more particularly, the present invention is directed to tools useful for installing cables for such applications.

BACKGROUND OF THE INVENTION

There exists a need in the art to overcome the deficiencies and limitations of the prior art. More particularly, the present invention enables one worker to install a connector without the assistance of a second worker.

The recitation herein of desirable objects which are met by various embodiments of the present invention is not meant to imply or suggest that any or all of these objects are present as essential features, either individually or collectively, in the most general embodiment of the present invention or any of its more specific embodiments.

SUMMARY OF THE INVENTION

The shortcomings of the prior art are overcome and additional advantages are provided through a socket which includes a housing having a first end dimensioned and configured for cooperation with an associated wrench and a second end dimensioned and configured for engagement with a locknut, the second end including a first plurality of magnets disposed to maintain a single locknut against the second end, the second end including a second plurality of magnets disposed to maintain the second end against an associated housing with the associated locknut disposed intermediate the second end of the socket and the associated housing.

The second end of the socket including a plurality of depending feet dimensioned and configured for meshing engagement with the locknut whereby rotation of the socket causes rotation of the locknut when the locknut is engaged with an associated externally threaded connector to move the locknut axially along the external threads of the externally threaded connector.

The second end of the socket includes a first plurality of magnets disposed to retain a locknut against the second end and a second plurality of magnets disposed to retain the second end against an associated housing with the associated locknut intermediate the socket in the associated housing.

In some embodiments each of the magnets is axially elongated and has a geometric axis. Each magnet may be parallel to every other axis of every other magnet in the socket.

The socket may have the axis of each magnet in the first plurality of magnets coinciding with a first virtual cylinder and the axis of each magnet in the second plurality of magnets may coincide with a second virtual cylinder. Each of the magnets may be cylindrical and may be axially magnetized as well as being manufactured of neodymium.

The socket as described in claim 1 wherein each magnet is parallel to every other magnet and each magnet has a north and a south pole and the physical orientation each north and south pole is identical.

In some cases the socket includes apparatus for holding an associated lock nut having internal screw threads with the screw threads disposed in aligned coaxial relationship with a bore in an associated wall extending through the associated wall from a first side to a second side whereby a single user may move to the other side of the wall and manually engage external screw threads of an associated connector extending through the second side to the internal screw threads of the associated locknut on a first side without touching the apparatus for holding or the associated locknut.

Accordingly, it is an object of the present invention to permit a single worker to install a connector that would otherwise require a two worker team to accomplish.

It is another object of the present invention to reduce the complexity inherent in synchronizing the acts of a two worker team.

It is yet another object of the present invention to reduce labor costs.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1 is a side view of one embodiment of the socket in accordance with one form of the present invention.

FIG. 2 is a bottom view of the socket illustrating the face thereof that engages a lock nut.

FIG. 3 is a top view of the socket illustrating the drive surfaces for engaging, for example, an open end wrench, a box wrench or a ratchet wrench.

FIG. 4 is an isometric view illustrating the socket.

FIG. 5 is a detailed view of the circled part of the bottom view shown in FIG. 2.

FIG. 6 is another isometric view illustrating the socket.

FIG. 7 is a more detailed view of the bottom of the socket that engages the locknut.

FIG. 8 is a more detailed view of the side of the socket and particularly the magnets therein.

FIG. 9 is a view of a typical lock nut.

FIG. 10 is a view of a typical connector used, for example, to connect to the wall of a cabinet or a connection box.

FIG. 11 is a view of the lock nut shown in FIG. 9 disposed in meshing engagement with the bottom of the socket in accordance with the present invention.

DETAILED DESCRIPTION

Figure 12:
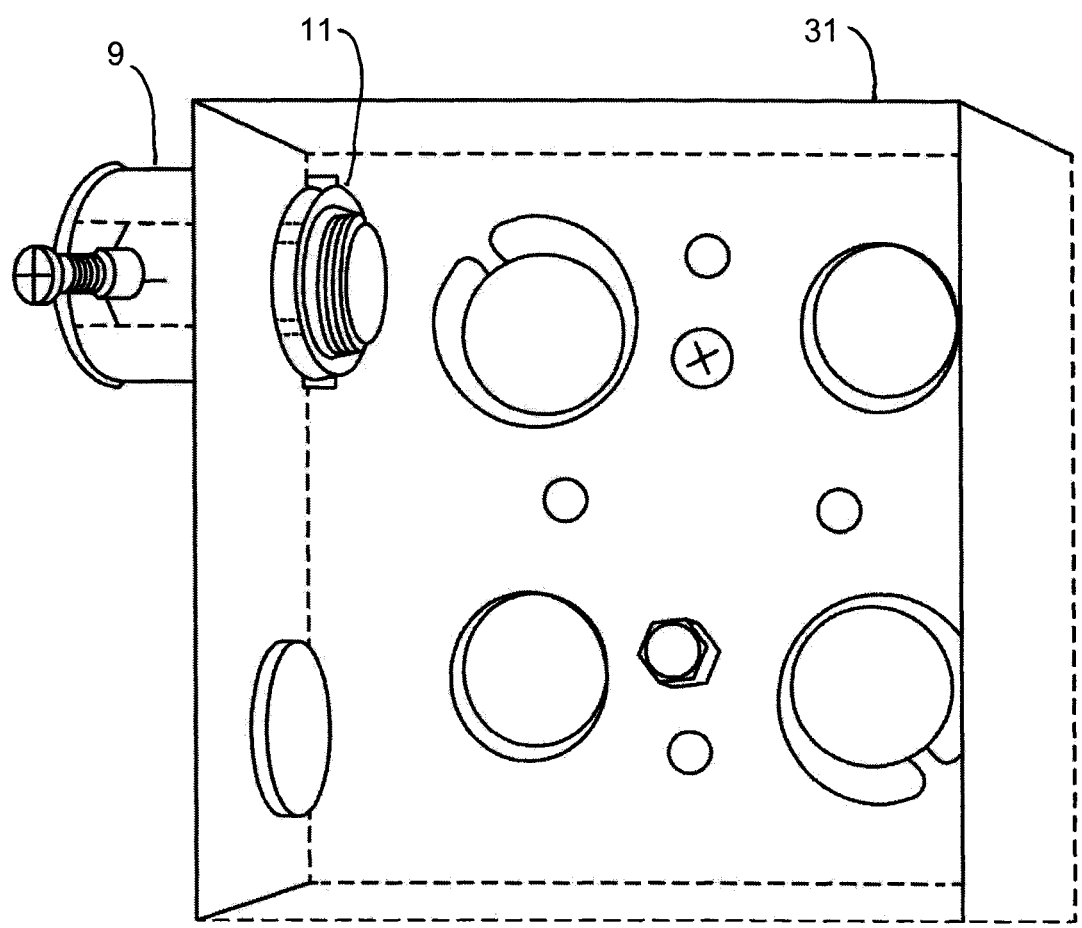
FIG. 12 illustrates the use of a lock nut to secure a connector to a conventional connection box. This view is intended only to illustrate the simplicity of the installation in a small box instead of a large cabinet. Installation on a large cabinet is considerably more difficult because no single person can reach both sides of the same cabinet wall.

A typical connector 10 that is secured in place by a lock nut 11 is illustrated in FIG. 10. FIG. 9 illustrates in greater detail a typical lock nut 11. The locknut 11 is provided with 6 uniformly spaced ears 12. All of the ears 12 are identical. Each successive ear is circumferentially spaced 60° apart from the each other adjacent ear 12. Accordingly, the typical lock nut has rotational symmetry at 60°. The term rotational symmetry of 60° will be understood in this context to refer to the number of degrees the lock nut can be rotated to a position wherein the shape of the respective outer surfaces of the lock nut are identical to the shape of the outer surface of the lock nut before the rotation. Thus, the lock nut is rotationally symmetrical and has an order of rotational symmetry of 6.

The socket 20 in accordance with the present invention is dimensioned and configured for engagement with the ears 12 of the lock nut 11. The socket 20 has hexagonal drive surfaces 40 and ratchet wrench engagement square recess 42 on a first axial extremity. The opposite extremity has six feet 24 extending longitudinally from a second axial extremity. Each of the six feet 24 include a centrally disposed elongated cylindrical magnet 26. The axis/center lines of each magnet 26 is coincident with a first virtual cylinder. The feet 24 are dimensioned and configured to engage and mesh with the sides of the ears 12.

It will be understood that the axial extremities of the magnets 26 are disposed in a common plane as best seen in FIG. 8. That common plane that is coincident with another common plane defined by the lower extremities of the feet 24 as also shown in FIG. 8. Accordingly, both common planes engage the wall of the cabinet as described above.

Each socket 20 in the illustrated embodiment also includes 6 elongated cylindrical magnets 28. It will be understood that the geometric axis of each of the magnets 28 are disposed coincident with a second virtual cylinder. This set of six magnets 28 hold the locknut 11 in the socket 20. As seen in FIG. 8, the common plane defined by the axial extremities of the magnets 28 is recessed with respect to the common plane of the axial extremities of the magnets 26.

The illustrated socket 20 is rotationally symmetrical and has an order of rotational symmetry of 6.

The magnets 26, 28 in one embodiment of the present invention are all 3 mm×4 mm cylindrical rare earth neodymium magnets.

To install a connector 9 to, for example, a 6-inch square connection box 31 as shown in FIG. 12, the installation can be accomplished by a single person using one hand to hold the connector 9 body and using the other hand to secure the locknut 11 to the body of the connector 9. However, if the installation is in the side of a cabinet having, for example, a height of 7.0 feet and a width of 6.0 feet with one or more hinged doors for accessing the interior, it is impossible for a single person to access both the connector 20 body and the lock nut 11. The present invention enables a single worker to accomplish the installation in the wall of a large cabinet.

More particularly, a single worker can engage the locknut 11 with the socket 20. That engagement is secured by the magnets 28. The worker will, for example, position the lock nut 11 on a first side of the cabinet wall in coaxial abutting relationship with a hole in the associated cabinet (not shown). The magnets 26 will hold the locknut and the socket in the desired position on the cabinet wall. Thereafter, the worker moves to the second side of the wall, inserts the threaded axial extremity of the connector 10 through the wall, engages the threaded axial extremity of the connector 10 with the locknut 11. Final assembly is completed by moving back to the first side to rotate the socket to a fully tightened position. This is achieved without the need for an additional worker or even the need to coordinate with another worker.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by the appended claims, in which reference to an element in the singular is not intended to mean "one and only one" unless explicitly so stated, but rather "one or more." All structural, chemical and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component or method step is explicitly recited in the claims. No claim element herein is to be construed under the provisions of 35 U.S.C. 112, sixth paragraph, unless the element is expressly recited using the phrase "means for."

What is claimed is:

1. A socket which comprises:
a housing having a first end dimensioned and configured for cooperation with an associated wrench and a second end dimensioned and configured for engagement with a locknut, said second end including a first plurality of magnets disposed to maintain a single locknut against said second end, said second end including a second plurality of magnets disposed to maintain said second end against an associated housing with the associated locknut disposed intermediate the second end of the socket and the associated housing;
said second end of said socket including a plurality of depending feet dimensioned and configured for meshing engagement with the locknut whereby rotation of the socket causes rotation of the locknut when the locknut is engaged with an associated externally threaded connector to move the locknut axially along the external threads of the externally threaded connector;
said second end of said socket including a first plurality of magnets disposed to retain a locknut against said second end and a second plurality of magnets disposed to retain said second end against an associated housing with the associated locknut intermediate said socket in the associated housing.

2. The socket as described in claim 1 wherein each of said magnets is axially elongated and has a geometric axis.

3. The socket as described in claim 2 wherein the axis of each magnet is parallel to every other axis of every other magnet in said socket.

4. The socket as described in claim 2 wherein the axis of each magnet in said first plurality of magnets coincides with a first virtual cylinder and the axis of each magnet in said second plurality of magnets coincides with a second virtual cylinder.

5. The socket as described in claim 1 wherein each of said magnets is cylindrical.

6. The socket as described in claim 1 wherein each of said magnets is axially magnetized.

7. The socket as described in claim 1 wherein each magnet is parallel to every other magnet and each magnet has a north and a south pole and the physical orientation each north and south pole is identical.

8. The socket as described in claim 1 wherein each of said magnets is manufactured of neodymium.

9. A socket including:
   magnetic means for holding an associated lock nut having internal screw threads with said screw threads disposed in aligned coaxial relationship with a bore in an associated wall extending through the associated wall from a first side to a second side;
   whereby a single user may move to the other side of the wall and manually engage external screw threads of an associated connector extending through the second side to the internal screw threads of the associated locknut on a first side without touching said means for holding or the associated locknut.

\* \* \* \* \*